United States Patent
Mizuno et al.

(10) Patent No.: US 6,455,147 B1
(45) Date of Patent: Sep. 24, 2002

(54) REACTION INJECTION-MOLDED FOAM MOLDINGS

(75) Inventors: Hisashi Mizuno; Yoshiharu Tsutsui; Takahiro Yamada, all of Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/685,898

(22) Filed: Oct. 11, 2000

(30) Foreign Application Priority Data

Nov. 17, 1999 (JP) .......................................... 11-327100

(51) Int. Cl.$^7$ ................................................. B32B 3/26
(52) U.S. Cl. ................................ 428/318.6; 428/308.4; 428/318.8; 428/319.3; 428/218
(58) Field of Search ........................... 428/308.4, 318.8, 428/319.3, 218, 318.6

(56) References Cited

U.S. PATENT DOCUMENTS 4,209,564 A * 6/1980 Normura et al. ............. 428/315
5,300,532 A * 4/1994 Takimoto et al. ............. 521/51

\* cited by examiner

*Primary Examiner*—Blaine Copenheaver
*Assistant Examiner*—Hai Vo
(74) *Attorney, Agent, or Firm*—Pillsbury Winthrop LLP

(57) ABSTRACT

A reaction-injected foam molding comprising a skin coating film formed by the in-mold coating method and having an elongation at break of 20–200% (JIS K 6400: No. 1 dumbbell test specimen) and a urethane foam body obtained by reaction injection molding and having a density of 0.35–0.60 g/cm$^3$. Said molding permits easy removal of flashes even though the urethane foam body is of a high ratio expansion with a density of 0.35–0.60 g/cm$^3$.

2 Claims, 2 Drawing Sheets

REACTION INJECTION-MOLDED FOAM MOLDINGS

BACKGROUND OF THE INVENTION

The present invention relates to a foam molding comprising a skin coating film formed by the in-mold coating method and a urethane foam body obtained by reaction injection molding (said foam molding being hereinafter referred to as "RIM foam molding"). In more particular, the invention relates to RIM foam moldings which, when used for the ring part or the spoke part of steering wheels or the like, permit easy removal of flashes therefrom.

RIM foam moldings are in wide use in steering wheels for vehicles, such as automobiles and the like, horn pads, arm rests, etc.

For example, a ring part 10 of a steering wheel is produced by covering a ring part core bar 12 with a urethane foam body 14 (usually semi-rigid) having a flexible, integral skin and further, to enhance the light resistance and abrasion resistance, forming a skin coating film 10 on the urethane foam surface (see FIG. 1).

The above-mentioned urethane foam body is usually formed by RIM (reaction injection molding), because the mold clamping pressure in RIM is small (about 1/10 or less of that in the injection molding of usual thermoplastic resin) and moreover the energies required for heating and cooling of the mold are also small. The above-mentioned skin coating film is in most cases formed by the in-mold coating method because of the good productivity and other merits of the method.

Thus, the ring part of a steering wheel has generally been formed in the manner described below.

(1) A skin coating film (in-mold coating film) 16 is formed by means of spray coating, etc., on the cavity surfaces 18a and 20a of a flask mold (in the example shown by the Figure, upper mold-under mold) 18 and 20 (see FIG. 2).

(2) A ring part core bar 12 is fixed to the mold in the open state, then the mold is closed, and a urethane material is poured in by injection.

(3) The urethane material is reaction-cured, and then the resulting molding is released from the mold. On the ring part 10 of the molding released from the mold, there remains a flash 22 at the position of the matching face (in other words, parting line) of the mold as shown in FIG. 3, so that the molding is finished by conducting deflating, to obtain the ring part of a steering wheel. In RIM, however, since the mold clamping force is small and the urethane material is injected into the mold in a state of low molecular weight having a good fluidity, flashes of a large width are apt to develop at the matching face of the mold.

SUMMARY OF THE INVENTION

The urethane foam in the ring part or the spoke part of previous steering wheels has a density of about 0.7 g/cm$^3$, but, owing to the recent requirement for lighter weight steering wheels, urethane foams of high ratio expansion type having a density of about 0.5 g/cm$^3$ have come to be required. However, it has been revealed that when a urethane foam of high ratio expansion type is used, the flash is apt to be removed with difficulty.

In view of the above-mentioned situations, the object of the present invention is to provide a foam molding which permits easy removal of flashes even when it is a foam molding of high ratio expansion type.

The present inventors have made extensive study to solve the above-mentioned problems and, in the course of the study, have found that when a skin coating film which has a small elongation at break is used in the foam molding, the flash can be easily removed. On the basis of the above finding, the present inventors have arrived at a reaction-injected foam molding having the structure described below.

Thus, the foam molding of the present invention comprises a skin coating film formed by the in-mold coating method and having an elongation at break of 20–200% (JIS K 6400; No. 1 dumb-bell test specimen) and a urethane foam body obtained by reaction injection molding and having a density of 0.35–0.60 g/cm$^3$.

DETAILED DESCRIPTION OF THE INVENTION

Figure 1:
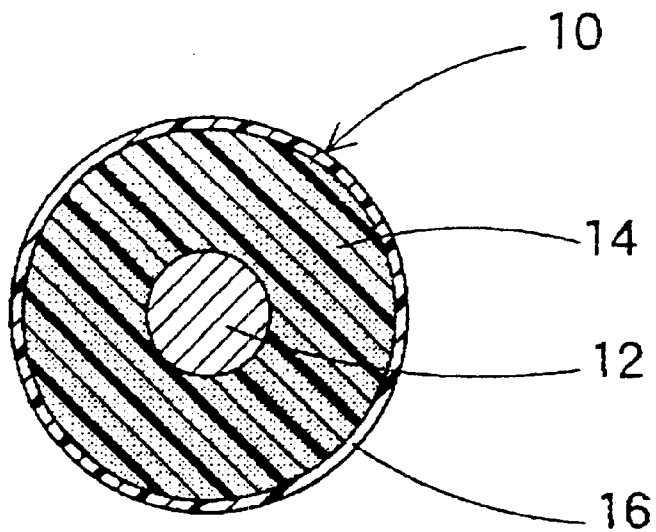
FIG. 1 shows a sectional view of the ring part of steering wheel which is one embodiment of the foam molding of the present invention.
Figure 2:
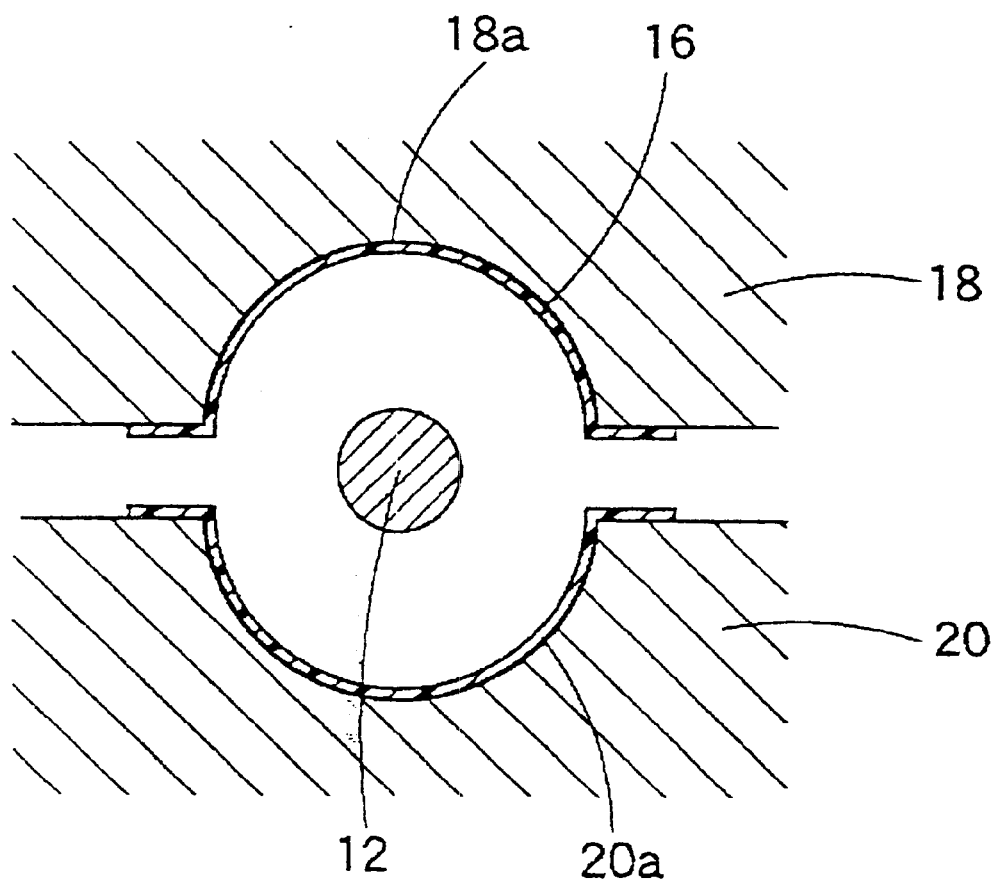
FIG. 2 shows a schematic sectional view in the ring part of a mold used for molding a steering wheel, at the time of mold opening.
Figure 3:
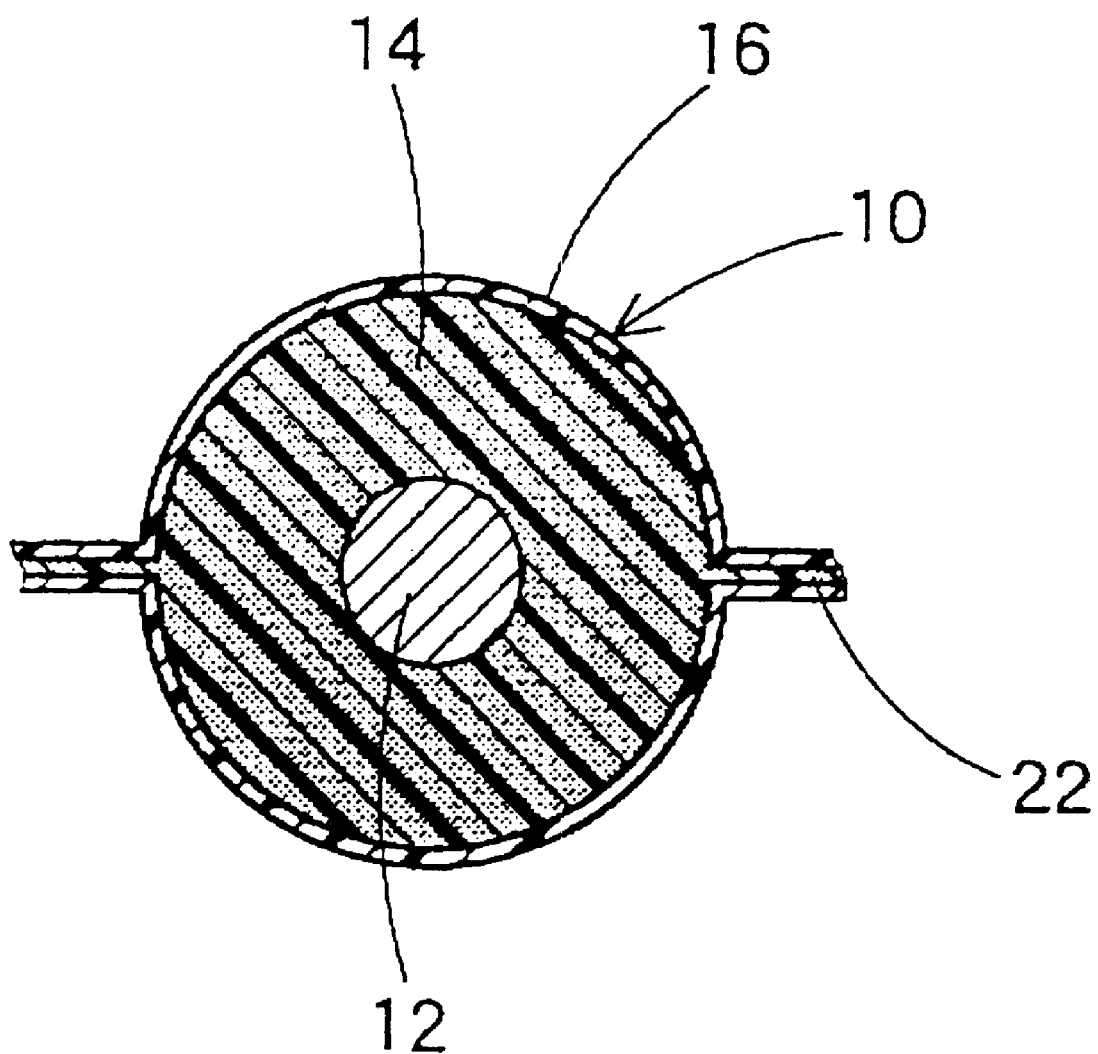
FIG. 3 shows a sectional view of the ring part of a steering wheel before removal of flashes.

The present invention is described in detail below.

(1) The prerequisite of the RIM foam molding (10) of the present invention is to be essentially constituted of a skin coating film (16) formed by the in-mold coating method and a urethane foam body (14) obtained by reaction injection molding and having a density of 0.35–0.60 g/cm$^3$.

Further, the RIM foam molding of the present invention is characterized in that the elongation at break ($E_b$) (JIS K 5400: No. 1 dumb-bell test specimen) of the skin coating film is 20–200%, preferably 25–150%, more preferably 30–140%.

When the elongation at break of the skin coating film (in-mold coating) is too small, the skin coating film is too rigid, resulting in poor touch and in decreased low-temperature impact resistance.

When the elongation at break of the skin coating film is too large, the intended effect of the present invention (easy deflashing operation) cannot be attained.

The urethane foam body is preferably reaction injection-molded by using a urethane material comprising a polyol component, a polyisocyanate component and a reaction-type foaming agent.

Though the amounts of the respective components in the urethane material are not particularly restricted, they should be in such a ratio of amount that can constitute a foaming formulation in reaction injection molding.

The amount of the reaction-type foaming agent to be compounded is preferably 1–6 parts, more preferably 2–4 parts, relative to 100 parts of the entire urethane material so that the urethane foam body may have a density of 0.35–0.60 g/cm$^3$.

The polyol component is not particularly restricted, and polyester type polyols may also be used. However, favorably used are polyether type polyols, which are excellent in resistance to hydrolysis and have a relatively lower viscosity as compared with polyester type ones. The polyol component preferably comprises high molecular weight polyols having a molecular weight of 1,000–10,000.

The polyether type polyols which may be used include, for example, disfunctional, trifunctional and tetrafunctional ones obtained by reacting a cyclic ether, such as ethylene oxide, propylene oxide, butylene oxide and styrene oxide, on a low molecular weight alcohol, such as propylene glycol, glycerol, trimethylolpropane and bisphenol A, or a low molecular weight amine, such as ethylenediamine; and further polymer polyols obtained by graft-polymerizing a vinyl monomer or the like thereto.

As to the polyisocyanate component, aromatic type isocyanates are preferably used because of their excellent reactivity. The polyisocyanate component preferably has an isocyanate content of 18–33.6%.

The aromatic type isocyanates which can be used include, for example, 4,4'-(or 2,4'-, 2,2'-)diphenylmethane diisocyanate (hereinafter abbreviated as MDI), crude MDI, liquid MDI, tolylene diisocyanate (TDI) and phenylene diisocyanate; further, prepolymers which have been modified, from the viewpoint of ease of handling, with a dimer, trimer or carbodiimide obtained by polymerizing a part of the above-mentioned component or with other alcohols may also be used. Particularly preferred among them are those of diphenylmethane type (MDI type) because of their quite excellent reactivity.

The above-mentioned reaction-type foaming agent used is preferably a carbamic acid salt and/or water.

The term "carbamic acid salt" herein means a compound selected from the group of the compounds represented by the following formulas (see JP-A-7-188367).

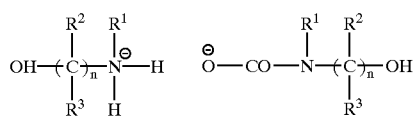

wherein $R^1$ is a hydrogen atom, a $C_1$–$C_3$ alkyl group or a group represented by the following formula

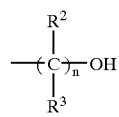

and wherein $R^2$ and $R^3$ may be the same or different and are each a hydrogen atom or a $C_1$–$C_3$ alkyl group; and n is an integer of 2–6.

The urethane material used in the present invention may be compounded with auxiliary materials which can be incorporated into conventional urethane materials, e.g., a chain extending agent, pigment, catalyst, etc.

The chain extending agent may be at least one low molecular weight polyol.polyamine having a molecular weight of 62–999. The amount of the chain extending agent used is usually 2–30 parts relative to 100 parts by weight of high molecular weight polyol. Specific examples of the chain extending agent include ethylene glycol, diethylene glycol, propylene glycol, 1,4-butanediol, 1,3-butanediol, trimethylolpropane, glycerol and diethyltolylenediamine.

The catalysts usually employed in the present invention are those of the tertiary amine type and the organometallic type. The tertiary amine type catalysts favorably used include, for example, triethylenediamine (TEDA) and 1,8-diazabicyclo[5,4,0]undecene-7 (DBU), and the organometallic catalysts favorably used include, for example, dibutyltin dilaurate (DBTDL) and dioctyltin mercaptide.

The skin coating film in the molding of the present invention is not particularly limited so long as the film has a good adhesion (adhesive property) to the urethane foam body and can meet the requirements for surface properties of the RIM foam moldings.

For example, it is preferable to use a urethane-based paint as the material for skin coating film because of its close relation to the material of the urethane foam body. The urethane-based paint may be either of the one-component type or of the two-component type. Usually it is preferable to employ for the skin coating film a paint which uses, as the polyol component, polyols of polyester type and/or acrylic type which are effective in imparting good abrasion resistance to the coating film and, as the isocyanate component, isocyanates of non-aromatic type (aliphatic type) shown below which are effective in imparting good light resistance to the coating film, because it facilitates obtaining a tough coating film.

The above-mentioned polyester type polyols which may be used are, for example, products obtained by reacting a dicarboxylic acid, such as succinic acid, glutaric acid, adipic acid, piperic acid and isophthalic acid with a diol component, such as ethylene glycol, diethylene glycol, 1,4-butanediol, 1,3-butanediol, polyoxyethylene glycol, dipropylene glycol and polyoxypropylene glycol; polycaprolactone polyol and polycarbonate polyol.

The acrylic type polyols which may be used are, for example, products obtained by reacting styrene, methyl methacrylate, n-butyl acrylate, n-butyl methacrylate or the like with β-hydroxyethyl methacrylate or the like.

The non-aromatic type isocyanates which may be used include, besides aliphatic isocyanates, also alicyclic isocyanates and are, for example, hexamethylene diisocyanate (HMDI), xylene diisocyanate (XDI), hydrogenated xylene diisocyanate (hydrogenated XDI), 4,4'-methylenedicyclohexyl diisocyanate (hydrogenated MDI), methylcyclohexyl diisocyanate (hydrogenated TDI) and isophorone diisocyanate (IPDI); and further, from the viewpoint of advantage in handling, so-called non-yellowing isocyanates, that is, dimers, trimers and prepolymers obtained by polymerizing the aforementioned isocyanates.

The urethane-based paint may be compounded with auxiliary materials, such as a pigment, chain extending agent, catalyst, etc., which can be incorporated into conventional urethane-based paints.

The chain extending agent and the catalyst which may be used are similar to those used in the urethane foam body described above.

The RIM foam molding of the present invention, in which the skin coating film formed by the in-mold coating method is made to have an elongation at break ($E_b$) (JIS K 5400: No. 1 dumb-bell test specimen) of 20–200%, exhibits the following beneficial actions and effects.

As supported in Examples mentioned below, the deflashing operation is facilitated even in RIM foam moldings of a high ratio expansion of which the urethane foam body has a density of 0.3–0.60 g/cm³.

In the case of normal urethane foam having a density of about 0.7 g/cm³, the flash has shape-retain-ability (so-called "nerve") and even when the skin coating film is soft, the knife can be made to bite thereinto, so that no problem arises in the deflashing operation.

However, when the urethane foam body is formed in a high ratio expansion (low density) of 0.60 g/cm³ or less, the skin coating layer (integral skin layer) correspondingly comes to have a low density, resultantly the flash has a poor shape-retainability (nerve) and the flash tends to escape when a knife is put against it. When a skin coating having a small elongation at break is used as in the present invention, shape-retainability is imparted to the flash, the knife can easily bite into the flash and resultantly the flash can be removed clean (can be removed easily).

The effect of the present invention is particularly marked when the invention is applied to such a molding as the ring part of a steering wheel in which flashes develop along the inner and outer peripheries and the distance along which deflashing finish is necessary is long and moreover a clean deflashing finish (flash removal) is required.

Though deflashing is usually done by manual operation using a cutter knife, the operation can also be mechanized (automated). When the flash is easy to remove as in the present invention, the mechanization of deflashing operation is more easily attained than in previous foam moldings.

DESCRIPTION OF PREFERRED EMBODIMENTS

The present invention is described in more detail below with reference to Examples and Comparative Examples, but the invention is not limited thereto.

A ring part of a steering wheel was molded and its behavior in deflashing was evaluated as described below.
(1) Skin Coating Film Skin coating films shown in Table 1 were used. The elongation at break ($E_b$) of each coating film was determined according to JIS K 6400 by using a No. 1 dumb-bell test specimen. The respective skin coating films were formed by spray-coating the respective urethane-based paints of the compositions shown in Table 1 respectively on the cavity surface of a mold for molding a steering wheel, that is in-mold coating (dry film thickness : about 5–10 μm). The coating width of the paint at the periphery of the mold was about 5–20 mm both on the inside and on the outside.

TABLE 1

| Skin coating film | Elongation at break (%) | Composition of urethane-based paint |
| --- | --- | --- |
| A (Comparative Example) | 233 | (One-component type) Polyesterpolyol/ isophorone diisocyanate type polyurethane resin |
| B | 180 | (One-component type) Polyesterpolyol/ hexamethylene diisocyanate type polyurethane resin |
| C | 40 | (Two-component type) Acrylpolyol/ isocyanurate-modified hexamethylene diisocyanate type polyurethane resin |
| D | 133 | (Two-component type) Polyesterpolyol/ hexamethylene diisocyanate type polyurethane resin |
| E | 30 | (Two-component type) Acrylpolyol/ isocyanurate-modified hexamethylene diisocyanate type polyurethane resin |
| F | 53 | (Two-component type) Acrylpolyol/ isocyanurate-modified hexamethylene idisocyanate type polyurethane resin |

(2) Steering Wheel

After forming the skin coating film as described above, the mold was closed and the urethane materials shown in Table 2 were reaction injection-molded under the conditions described below to form the ring parts of steering wheels comprising the skin coating films A-F and the urethane foam bodies 1–4. For each of the skin coating films A–F were prepared 4 kinds of ring part different in the density of urethane foam body (that is, urethane foam bodies with a density of 0.4, 0.5, 0.6 or 0.7 g/cm³).

Mold : 4-core, S/W type
Injection speed: 180 g/s
Injection pressure: 15 MPa (for both polyol and isocyanate)
Mold temperature: 60° C.
Material temperature: 30° C. (both polyol and isocyanate)
Cure time: 180 s

TABLE 2

| Urethane foam body | Foaming agent | Polyol | Isocyanate | Density (g/cm³) |
| --- | --- | --- | --- | --- |
| 1 | Water | Polyether polyol type system (hydroxyl value: 290) | MDI type (NCO 20%) | 0.4 |
| 2 | Water | Polyether polyol type system (hydroxyl value: 220) | MDI type (NCO 24%) | 0.5 |
| 3 | Amine carbamate | Polyether polyol type system (hydroxyl value: 220) | MDI type (NCO 21%) | 0.6 |
| 4 | Trichloro-monofluoro-methane | Polyether polyol type system (hydroxyl value: 185) | MDI type (NCO 28%) | 0.7 |

Evaluation of Behavior in Deflashing

After completion of the reaction injection molding, the molding was released from the mold to obtain the ring part of a steering wheel. Each of the ring parts thus obtained was subjected to deflashing finishing with a cutter knife, and the conditions of the remains of flash were evaluated. The results of evaluation are shown in Table 3.

TABLE 3

| Skin coating film | A (Comparative Example) | B | C | D | E | F |
| --- | --- | --- | --- | --- | --- | --- |
| Elongation at break (%) | 233 | 180 | 40 | 133 | 30 | 53 |
| Urethane foam body 1 (density: 0.4 g/cm³) | x | Δ | o | o | o | o |
| Urethane foam body 2 (density: 0.5 g/cm³) | x | Δ | o | o | o | o |
| Urethane foam body 3 (density: 0.6 g/cm³) | x | o | o | o | o | o |
| Urethane foam body 4 (density: 0.7 g/cm³) | o | o | o | o | o | o |

Note:
Criterion for evaluating behavior in deflashing
o: No flash remains with one time of finishing (cut in)
Δ: No flash remains with two times of finishing (cut in)
x: Flash remains even after two times or more of finishing (cut in)

It is revealed from Table 1–3 that the skin coating films B–F, which have an elongation at break less than 200%, show a good behavior in deflashing even when the urethane foam bodies are of a high ratio expansion with a density of 0.4–0.6 g/cm³. In particular, it is revealed that the skin coating films C–F, which have an elongation at break of less than 150%, show an excellent behavior in deflashing for high-ratio expansion moldings.

What is claimed is:
1. A foam molding comprising a skin coating film formed by the in-mold coating method and having an elongation at break of 20–200% (as determined according to JIS K 6400 using No. 1 dumb-bell test specimen) and a urethane foam body obtained by reaction injection molding and having a density of 0.35–0.60 g/cm³, wherein the urethane foam body is obtained by the reaction injection molding of a urethane material comprising a polyol component, a polyisocyanate component and a reaction foaming agent;

and further wherein the reaction foaming agent comprises at least one selected from a group consisting of carbamic acid salts and water;

and further wherein the skin coating film is a film of polyurethane-based paint comprising a polyester polyol and/or acrylic polyol and an aliphatic isocyanate.

2. The foam molding according to claim 1 wherein the foam molding is a steering wheel.

* * * * *